United States Patent
Bean

(10) Patent No.: US 6,783,422 B1
(45) Date of Patent: Aug. 31, 2004

(54) APPARATUS AND METHOD FOR CONTROLLING A VOLUME CHARACTERISTIC OF SOUND BEING EMITTED LATERALLY THROUGH INTERMEDIATE PORTS IN A GAME CALL

(75) Inventor: Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

(21) Appl. No.: 10/248,678

(22) Filed: Feb. 7, 2003

(51) Int. Cl.⁷ ............................................. A63H 33/40
(52) U.S. Cl. ...................................... 446/202; 446/206
(58) Field of Search ................................ 446/202, 206, 446/208, 207, 213, 214, 176; 84/402

(56) References Cited

U.S. PATENT DOCUMENTS

| | | | | |
|---|---|---|---|---|
| 4,940,451 A | * | 7/1990 | Leady | 446/208 |
| 5,910,039 A | | 6/1999 | Primos et al. | |
| 6,053,794 A | * | 4/2000 | Weiser | 446/207 |
| 6,095,884 A | * | 8/2000 | Wiley | 446/208 |
| 6,254,451 B1 | * | 7/2001 | Bean | 446/207 |

OTHER PUBLICATIONS

Lynne Wilbanks Jeter, "Primos' Hunting Calls readying new facility", Mississippi Business Journal, vol. 24, No. 10, Mar. 4–10, 2002, Flora, Mississippi (printed Apr. 1, 2003 from website).

Ken Bailey, "Gear of the Year 2002 (part 5)", Outdoor Canada (printed Apr. 1, 2003 from website).

The Editors, "Best of the Best, Primos Hoochie Mama, Storm WildEye Swim Shad", Field & Stream (printed Apr. 1, 2003 from website).

* cited by examiner

Primary Examiner—Jacob K. Ackun
Assistant Examiner—Jamila Williams
(74) Attorney, Agent, or Firm—Simmons, Perrine, Albright & Ellwood, PLC

(57) ABSTRACT

A game call with a game call multi-colored volume and tone control which includes a game call volume and tone control-tapered inner chamber and a rotatable game call volume and tone control outer chamber having an outer chamber sound exiting port which variably exposes alternately oriented inner chamber sound exiting ports.

20 Claims, 4 Drawing Sheets

United States Patent US 6,783,422 B1

APPARATUS AND METHOD FOR CONTROLLING A VOLUME CHARACTERISTIC OF SOUND BEING EMITTED LATERALLY THROUGH INTERMEDIATE PORTS IN A GAME CALL

BACKGROUND OF INVENTION

In the past, hunters have used various devices to call game, such as the ubiquitous tube call, in which air is blown through a mouthpiece and over a reed to generate sound. Other calls, such as described in U.S. Pat. No. 6,254,451 issued to Ron M. Bean for a "Game Call with Volume Control", have used a flexible bellows or bulb attached to a tube call to eliminate the need for blowing through the mouthpiece. In both of these examples, sound is produced pneumatically by air flowing over a reed or diaphragm, which induces vibration.

While these calls have many advantages, they also have significant drawbacks.

First of all, the skill required to successfully operate a pneumatically driven call at a low volume is often more than is possessed by inexperienced or infrequent hunters and game callers.

Secondly, in some calls, the lower volume threshold for normal operation may exceed a desired volume level.

Thirdly, the calls using bellows and bulbs have often had limited operational characteristics, owing to the lessened control that a bellows often has in comparison to a mouth-blown call.

Consequently, there exists a need for improvement in game calling methods and apparatuses.

SUMMARY OF INVENTION

It is an object of the present invention to provide an easily operated game call having volume variation capabilities.

It is a feature of the present invention to include an adjustable sound output port.

It is an advantage of the present invention to allow for manipulation of the call volume in an easy-to-use fashion.

It is another advantage of the present invention to increase the certainty that the call will produce an appropriate sound.

The present invention is an apparatus and method for calling game which is designed to satisfy the aforementioned needs, provide the previously stated objects, include the above-listed features and achieve the already articulated advantages. The present invention is carried out in an "error-less multi-volume" approach in a sense that the amount of errant sounds, which often are produced when attempting to make a softer sound in a pneumatically driven call, is dramatically reduced.

Accordingly, the present invention is an apparatus and method for controlling the volume of a game call which includes a twistable and partially open sleeve disposed axially about an inner sound chamber with a sound port therein.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
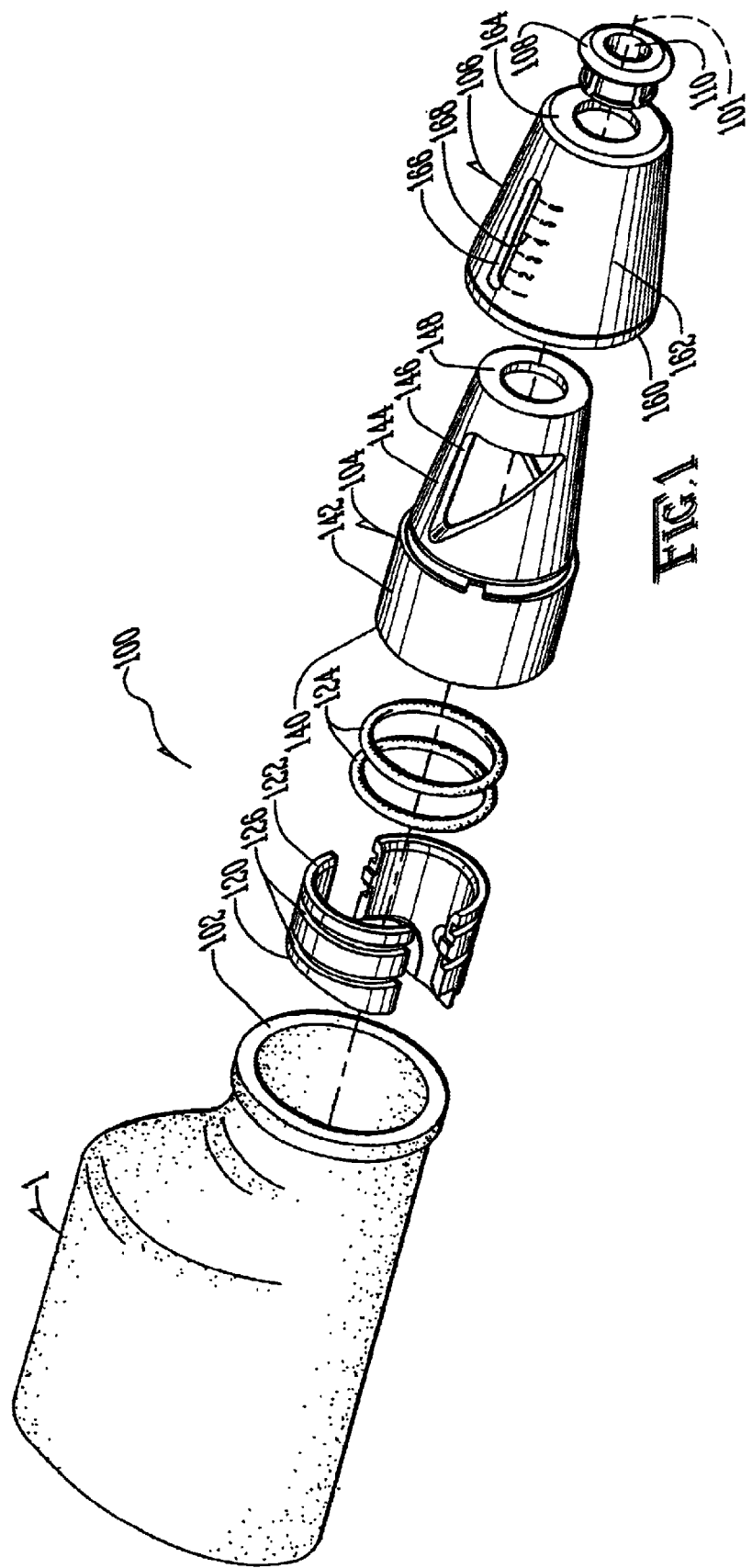
FIG. 1 is a partially exploded perspective view of the game call and call volume control of the present invention.

Now referring to the drawings, wherein like numerals refer to like matter throughout, and more particularly to FIG. 1, there is shown a game call 1 and game call volume control 100, with an airflow axis 101 and also which includes a game call sound outlet end 102, a game call volume control inner chamber 104, a game call volume control outer chamber 106, and an outer chamber to inner chamber fastener 108. Game call 1 could be a hand-operated squeezable bellows—type call, as shown, or a mouth or lip-blown call or any type of pneumatic game call.

Game call sound outlet end 102, game call volume control inner chamber 104 and game call volume control outer chamber 106 could be any suitable material, such as wood, PVC, or other synthetic material which is sufficiently rigid to permit proper operation of the present invention. Outer chamber to inner chamber fastener 108 could be of similar material.

Game call volume control 100 is intended to be affixed to or integrated with a game call sound outlet end 102 of any type of pneumatically driven game call.

Game call sound outlet end 102 is shown as including a game call body 120 having one or more O-ring grooves 126 therein. Game call sound outlet end 102 includes a game call sound outlet terminal end 122, which is inserted into or integrated with game call volume control inner chamber 104. When game call sound outlet terminal end 122 is inserted into game call volume control inner chamber 104, one or more O-rings 124 are disposed in O-ring grooves 126 to maintain a pneumatic seal. Other means of sealing game call sound outlet end 102 to game call volume control inner chamber 104 could be substituted. No means of sealing game call sound outlet end 102 to game call volume control inner chamber 104 would be needed if they were integrated.

Game call volume control inner chamber 104 may have an inner chamber inlet end 140 which receives game call sound outlet terminal end 122. Game call volume control inner chamber 104 may have an inner chamber unsleeved exterior section 142 and an inner chamber sleeved interior section 144. Preferably, inner chamber sleeved interior section 144 has a decreasing cross-sectional diameter going from inner chamber unsleeved exterior section 142 to inner chamber outlet end 148. Inner chamber sleeved interior section 144 may have at least one, but preferably two or more, inner chamber sound exiting ports 146. Preferably, inner chamber sound exiting port 146 is not a simple narrow slot running along the longitudinal axis of game call volume control 100 from game call body 120 to airflow exit orifice 110. Preferably, inner chamber sound exiting port 146 is a generally triangular shaped orifice in the side of inner chamber sleeved interior section 144 between inner chamber unsleeved exterior section 142 and inner chamber outlet end 148. It should be understood that the present invention is described as a twisting volume control; however, a sliding volume control could be substituted. When a sliding volume control is used, it will likely be necessary to change the shape and orientations of inner chamber sound exiting port 146 and outer chamber sound exiting port 166. The concept, a variably sized exposed inner port, would be readily implemented in many different configurations.

Inner chamber outlet end 148 may be configured to be inserted into game call volume control outer chamber 106 at the outer chamber inlet end 160. Game call volume control outer chamber 106 may have an outer chamber exit end 164 and an outer chamber sound exiting port 166 in outer chamber sleeve 162. An outer chamber sound exiting measurement scale 168 is preferred to be located adjacent to outer chamber sound exiting port 166 so as to provide a visual indication of a volume setting for the game call volume control 100. It may be preferred to have inner chamber sleeved interior section 144 have a contrasting color in comparison to outer chamber sleeve 162. Inner chamber outlet end 148 may be colored the same as outer chamber sleeve 162 or inner chamber sleeved interior section 144.

Figure 4:
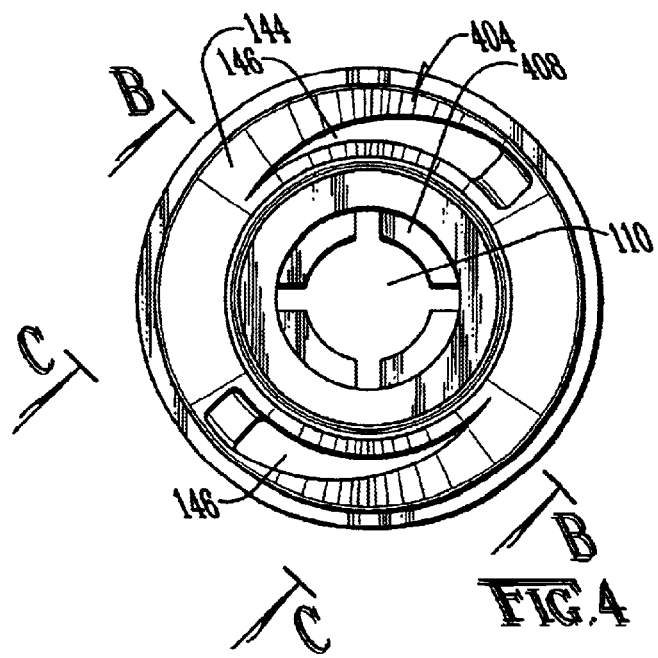
FIG. 4 is an end view of an inner chamber of an alternate embodiment of the present invention.
Figure 5:
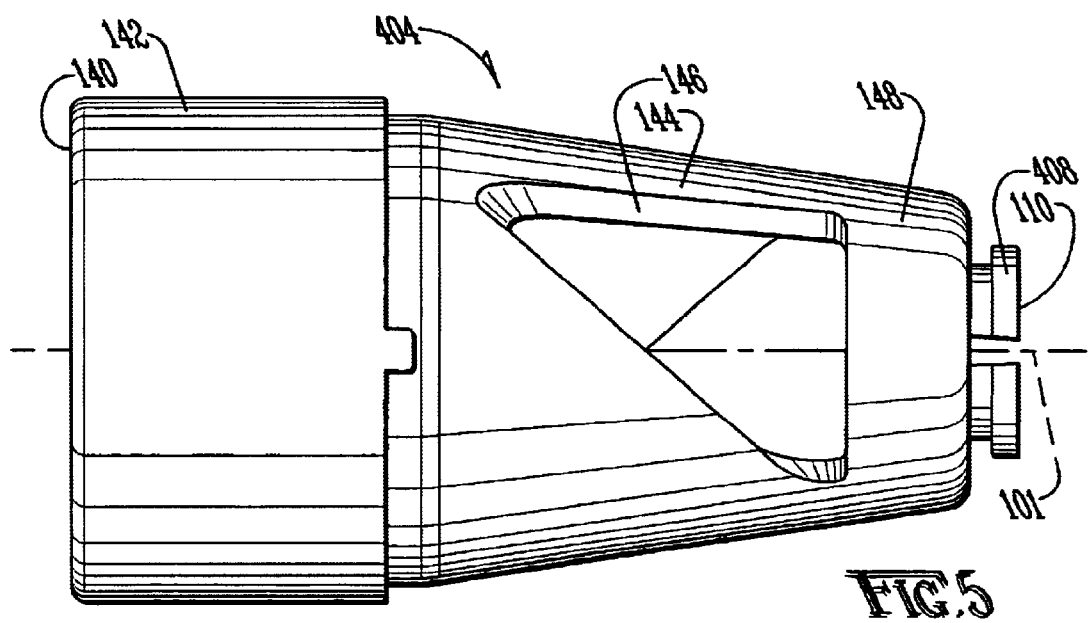
FIG. 5 is a side view of the inner chamber taken from line A—A of FIG. 4.
Figure 6:
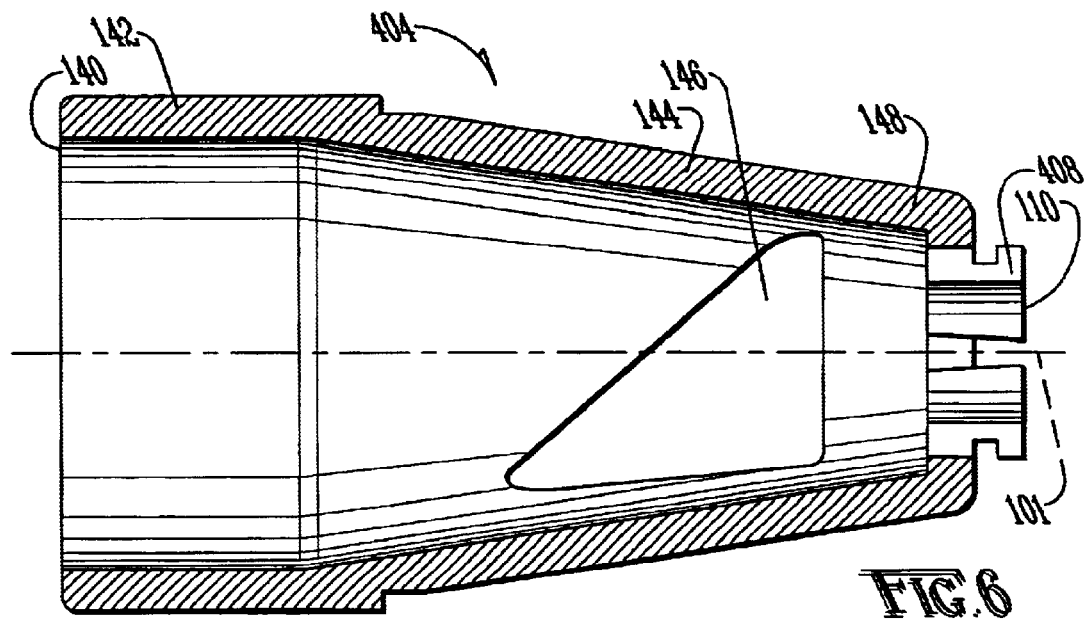
FIG. 6 is a cross-sectional view of the inner chamber taken on line B—B of FIG. 4.

Outer chamber to inner chamber fastener 108 with an airflow exit orifice 110 therein may be attached to game call volume control outer chamber 106 and game call volume control inner chamber 104 to hold the same in contact. Alternate configurations of attachment between game call volume control inner chamber 104 and game call volume control outer chamber 106 can be substituted. FIGS. 4–6 include an alternate means for coupling.

Figure 2:
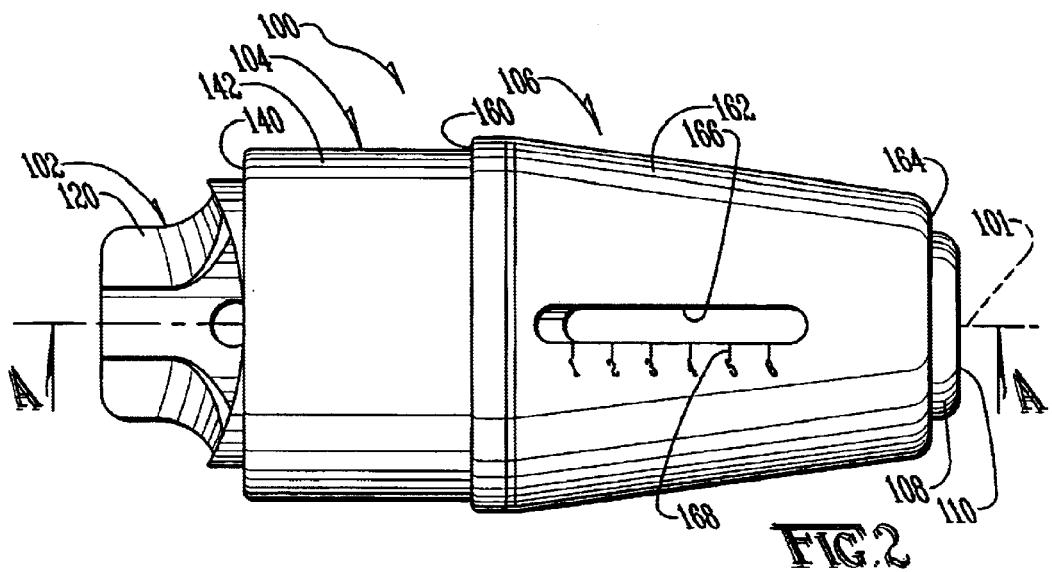
FIG. 2 is a side view of the assembled call volume control of FIG. 1.

Now referring to FIG. 2, there is shown a side view of the game call volume control 100 of FIG. 1 in a fully assembled configuration.

Figure 3:
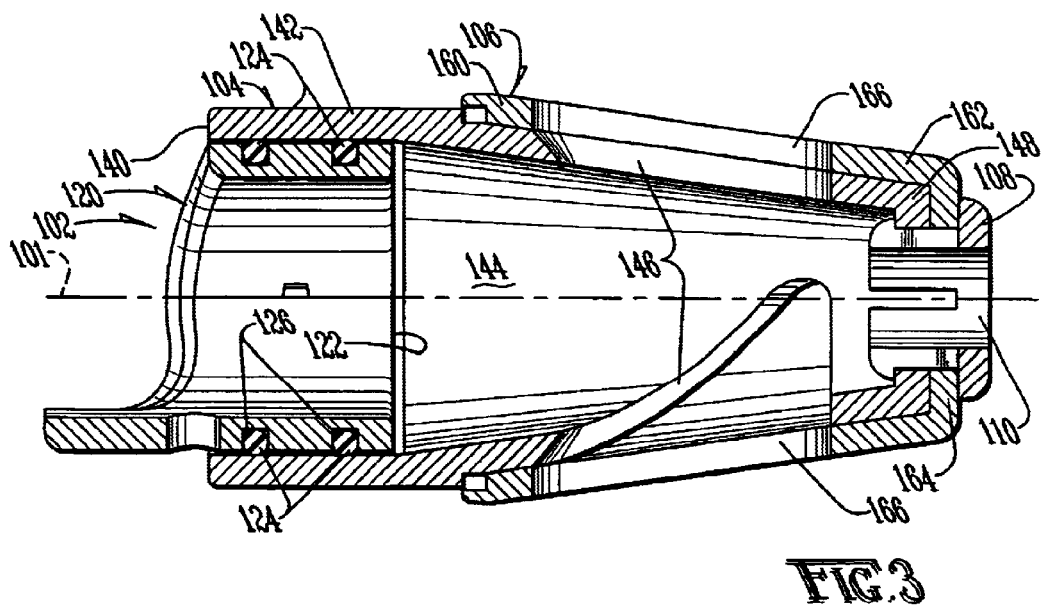
FIG. 3 is a cross-sectional view taken on line A—A of FIG. 1.

Now referring to FIG. 3, there is shown a cross-sectional view of the game call volume control 100 taken along line A—A of FIG. 1.

Now referring to FIG. 4, there is shown an alternate embodiment of the present invention which includes a fastener integrated game call volume control inner chamber 404 and an integrated fastener 408. Otherwise, game call volume control inner chamber 104 and fastener integrated game call volume control inner chamber 404 are nearly identical. FIG. 4 shows an end view of fastener integrated game call volume control inner chamber 404 looking through airflow exit orifice 110 toward inner chamber inlet end 140. Two inner chamber sound exiting ports 146 are shown disposed on opposing sides of inner chamber sleeved interior section 144.

FIG. 5 shows a side view of the fastener integrated game call volume control inner chamber 404 taken from line A—A of FIG. 4.

FIG. 6 shows a cross-sectional view of the fastener integrated game call volume control inner chamber 404 taken on line B—B of FIG. 4.

In operation, the present invention accomplishes the goal of generating sounds with variable volume characteristics as follows: air is moved through game call body 120, and a sound is produced therein. The air moves through game call volume control 100, while the sound vibrations propagate through the moving air. When the sound vibrations meet inner chamber sound exiting port 146, the vibration is permitted to propagate into any void exposed by inner chamber sound exiting port 146. However, depending upon the orientation of outer chamber sound exiting port 166 on game call volume control outer chamber 106 with respect to inner chamber sound exiting port 146, propagation of the sound radially from the longitudinal axis of game call volume control 100 can be permitted, precluded or variably permitted. When outer chamber sound exiting port 166 is aligned with a full-length segment of inner chamber sound exiting port 146, then the volume of sound emitting from outer chamber sound exiting port 166 is maximized. Likewise, when outer chamber sound exiting port 166 is aligned with a solid section of inner chamber sleeved interior section 144, then sound emitting from the inner chamber sound exiting port 146 is minimized. Variable sound volume levels are achievable by twisting game call volume control outer chamber 106, so that outer chamber sound exiting port 166 registers with variable lengths of inner chamber sound exiting port 146. Outer chamber sound exiting measurement scale 168 can be used to determine the volume setting by visual inspection of the relative size of the opening of inner chamber sound exiting port 146, which is visible through outer chamber sound exiting port 166.

Figure 7:
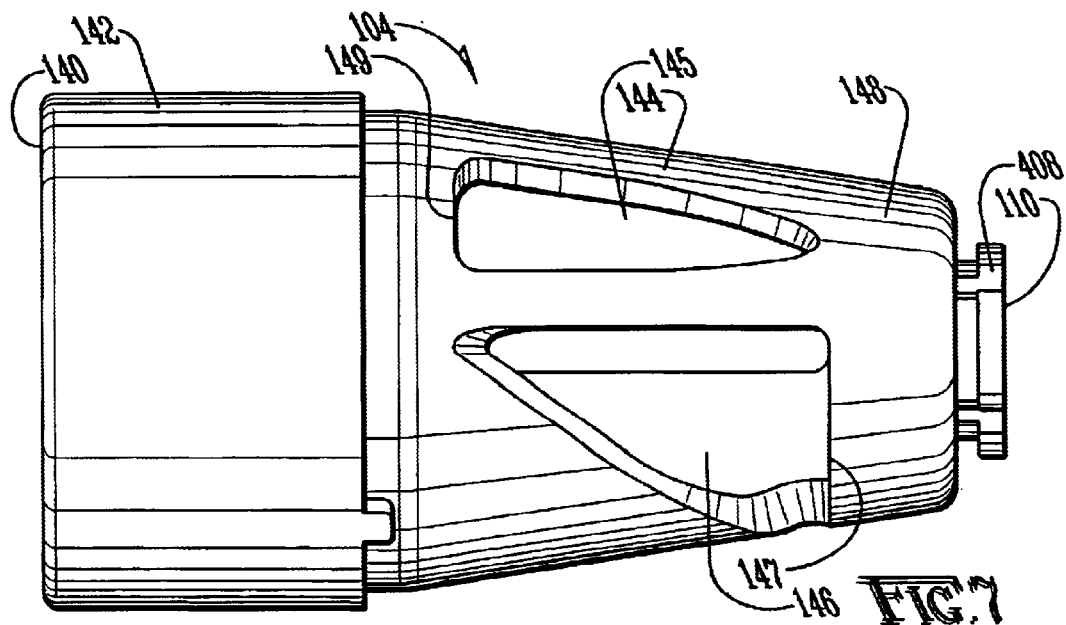
FIG. 7 is a side view of an embodiment of the present invention which shows dual alternately oriented inner chamber sound exiting ports.

Now referring to FIG. 7, there is shown an embodiment of the present invention which includes a first inner chamber sound exiting port and a second inner chamber sound exiting port 145. Inner chamber sleeved interior section 144 is shown to have a tapered shape so as to create a sound chamber capable of producing varying tones at various positions within game call volume control inner chamber 104. First inner chamber sound exiting port 146 has a first wide end 147, while second inner chamber sound exiting port 145 has a second wide end 149, which is in opposition along said first linear axis 101. Depending on which port is in alignment with outer chamber sound exiting port 166, the tonal characteristic of the sound output by the game call can be regulated as well.

It is thought that the method and apparatus of the present invention will be understood from the foregoing description and that it will be apparent that various changes may be made in the form, construct steps and arrangement of the parts and steps thereof, without departing from the spirit and scope of the invention, or sacrificing all of their material advantages. The form herein described is merely a preferred exemplary embodiment thereof.

What is claimed is:

1. A game call comprising:
   means for permitting airflow along a first linear axis and generating a sound in response thereto, which sound emulates noises made by a game animal;
   a game call volume control inner chamber having an inner chamber inlet end; an inner chamber outlet end; and a first inner chamber sound exiting port disposed between said inner chamber inlet end and said inner chamber outlet end;
   said game call volume control inner chamber being disposed about said first linear axis and oriented to receive airflow along said first linear axis;
   a game call volume control outer chamber sleeve disposed, at least in part, axially about a first portion of said game call volume control inner chamber;
   said game call volume control outer chamber sleeve having an outer chamber sound exiting port therein;
   means for coupling said game call volume control inner chamber and said game call volume control outer chamber sleeve so as to restrict relative movement along said first linear axis and simultaneously permit relative angular motion between said game call volume control inner chamber and said game call volume control outer chamber sleeve;
   said first inner chamber sound exiting port and said outer chamber sound exiting port being sized, shaped and configured to cause a variably sized continuous opening to exist through both of said game call volume control inner chamber and said game call volume control outer chamber sleeve, when said game call volume control outer chamber sleeve is rotated about said first linear axis; and
   whereby a volume characteristic of said sound can regulated in response to a rotation of said game call volume control outer chamber sleeve.

2. A game call of claim 1 further comprising:
means for indicating a sound volume regulation level.

3. A game call of claim 2 wherein said outer chamber sound exiting port is a linear slot disposed in said game call volume control outer chamber sleeve.

4. A game call of claim 3 wherein said means for indicating comprises a scale disposed on said game call volume control outer chamber sleeve.

5. A game call of claim 4 wherein said first inner chamber sound exiting port comprises an opening in said game call volume control inner chamber which is not a rectangular opening with an axis aligned with said first linear axis.

6. A game call of claim 5 wherein said first inner chamber sound exiting port is a triangular-shaped opening.

7. A game call of claim 6 wherein said triangular-shaped opening has a leg in alignment with said first linear axis.

8. A game call of claim 7 wherein said game call volume control inner chamber includes an inner chamber sleeved interior section which is disposed beneath said game call volume control outer chamber sleeve and said inner chamber sleeved interior section has a first color characteristic which is distinct from a second color characteristic of said game call volume control outer chamber sleeve.

9. A game call of claim 8 wherein said scale comprises a three dimensional relief with respect to said game call volume control outer chamber sleeve.

10. A game call of claim 9 wherein said first color characteristic is visible through said outer chamber sound exiting port when a regulation of volume is made so as to result in a diminished sound volume.

11. A game call of claim 10 further comprising a second first inner chamber sound exiting port which is oriented differently about said first linear axis than said first inner chamber sound exiting port.

12. A method of calling game comprising:
generating a sound in response to an airflow along a first linear axis;
regulating a volume characteristic of said sound by a rotation of a member around said first linear axis;
wherein said member has a sound exiting port therein which is oriented to allow a primary direction of airflow therethrough to be in a direction radial to said first linear axis; and
whereby a volume level of a sound which emulates noises made by an animal is regulated.

13. A method of claim 12 wherein said rotation causes regulation in size of said sound exiting port.

14. A method of calling game comprising:
generating a sound in response to an airflow along a first linear axis;
regulating a volume characteristic of said sound by a rotation of a member around said first linear axis;
whereby a volume level of a sound which emulates noises made by an animal is regulated;
wherein said rotation causes regulation in size of a sound exiting port; and wherein said sound exiting port allows airflow in a direction other than along said first linear axis.

15. A method of calling game comprising:
generating a sound in response to an airflow along a first linear axis;
regulating a volume characteristic of said sound by a rotation of a member around said first linear axis;
whereby a volume level of a sound which emulates noises made by an animal is regulated;
wherein said rotation causes regulation in size of a sound exiting port;
wherein said sound exiting port allows airflow in a direction other than along said first linear axis; and
wherein said rotation exposes either of a plurality of alternately oriented inner chamber sound exiting ports.

16. A method of calling game comprising:
generating a sound in response to an airflow along a first linear axis;
regulating a volume characteristic of said sound by a rotation of a member around said first linear axis;
whereby a volume level of a sound which emulates noises made by an animal is regulated;
wherein said rotation causes regulation in size of a sound exiting port;
wherein said sound exiting port allow airflow in a direction other than along said first linear axis;
making an observation, in relation to an adjacent scale, of an edge of one of a plurality of inner sound exiting ports through an outer chamber sound exiting port; and,
regulating a volume characteristic in response to said observation.

17. A method of claim 15 further comprising the steps of:
making an observation, in relation to an adjacent scale, of an edge of one of said plurality of alternately oriented inner chamber sound exiting ports through an outer chamber sound exiting port; and,
regulating a tonal characteristic in response to said observation.

18. A method of claim 17 further comprising the step of moving said outer chamber sound exiting port to expose another of said plurality of alternately oriented inner chamber sound exiting ports.

19. A method of claim 13 wherein said size of said sound exiting port is regulated to make said sound exit port nonexistent.

20. A game call comprising:
means for generating sound which emulates noises made by a game animal;
means for bounding a flow of air along a first axial direction;
a volume and tone control mechanism comprising:
a tapered game call volume control inner chamber having a plurality of alternately oriented triangular shaped inner chamber sound exiting ports therein;
said tapered game call volume control inner chamber having a first color characteristic;
a tapered game call volume control outer chamber sleeve having an outer chamber sound exiting port adjacent to a three dimensional outer chamber sound exiting measurement relief scale;
said tapered game call volume control outer chamber sleeve having a second color characteristic which is distinct from said first color characteristic; and,
said out chamber sound exiting port being configured as a linear slot through which said first color characteristic is visible.

* * * * *

UNITED STATES PATENT AND TRADEMARK OFFICE
CERTIFICATE OF CORRECTION

PATENT NO.      : 6,783,422 B1
DATED           : August 31, 2004
INVENTOR(S)     : Ron M. Bean It is certified that error appears in the above-identified patent and that said Letters Patent is hereby corrected as shown below:

Column 4,
Line 65, please insert the word -- be -- after the word "can".

Column 6,
Line 18, please delete the word "allow" and insert therefor -- allows --.
Line 21, please insert the word -- chamber -- after the word "inner".
Line 39, please delete the word "exit" and insert therefor -- exiting --.
Line 53, after the word "port", please insert the word -- therein --.

Signed and Sealed this

Eighth Day of February, 2005

JON W. DUDAS
*Director of the United States Patent and Trademark Office*